JOSEPH R. KIOVSKY
CARL D. SPANGLER, JR
JOHN H. SMITH
INVENTORS.

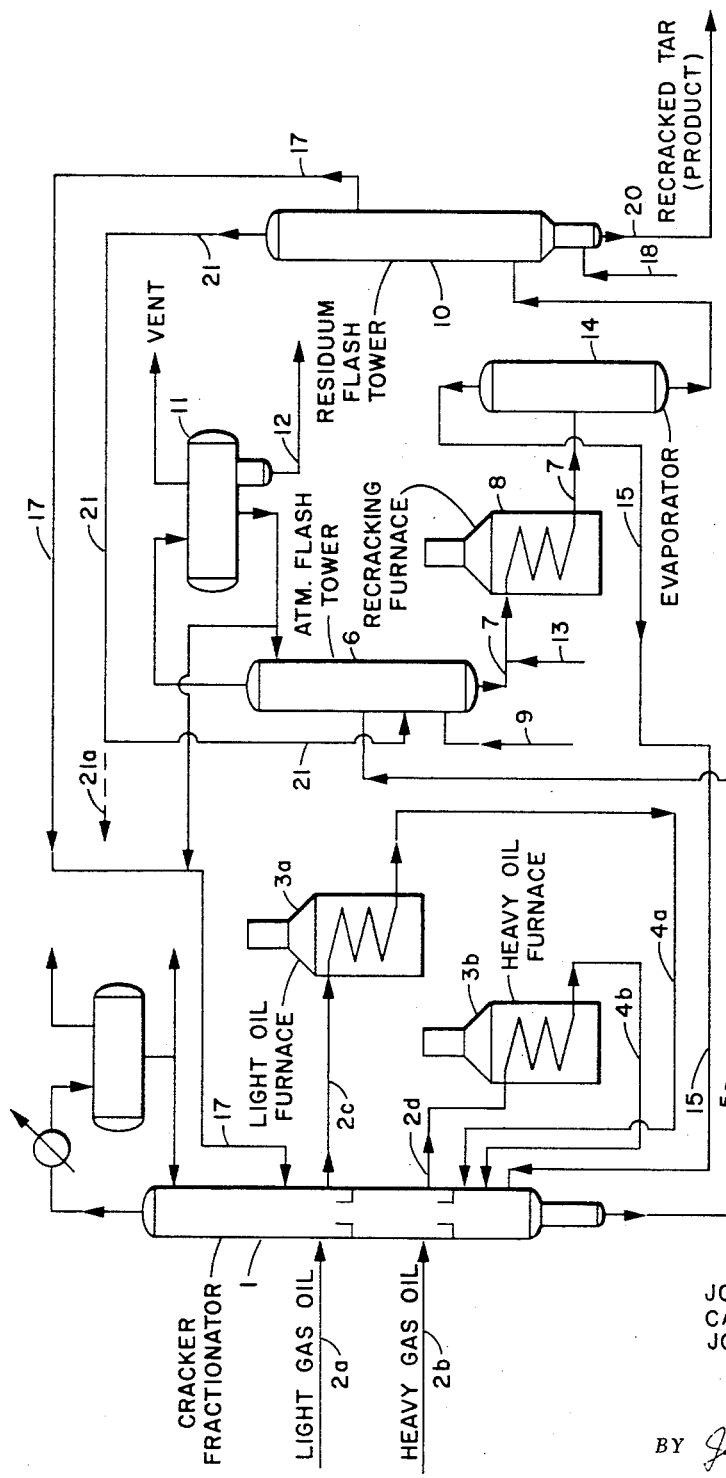

United States Patent Office 3,412,009
Patented Nov. 19, 1968

3,412,009
PROCESS FOR PRODUCING CARBON
BLACK OIL
John H. Smith, Carl D. Spangler, Jr., and Joseph R.
Kiovsky, Ponca City, Okla., assignors to Continental
Oil Company, Ponca City, Okla., a corporation of
Delaware
Filed Mar. 15, 1967, Ser. No. 623,387
6 Claims. (Cl. 208—72)

ABSTRACT OF THE DISCLOSURE

Process for the manufacture of carbon black feedstock oils by the thermal recracking of a tar derived from the thermal cracking of a virgin petroleum gas oil, followed by recovery of a recracked tar suitable for use as a carbon black oil.

Background

Figure 1:
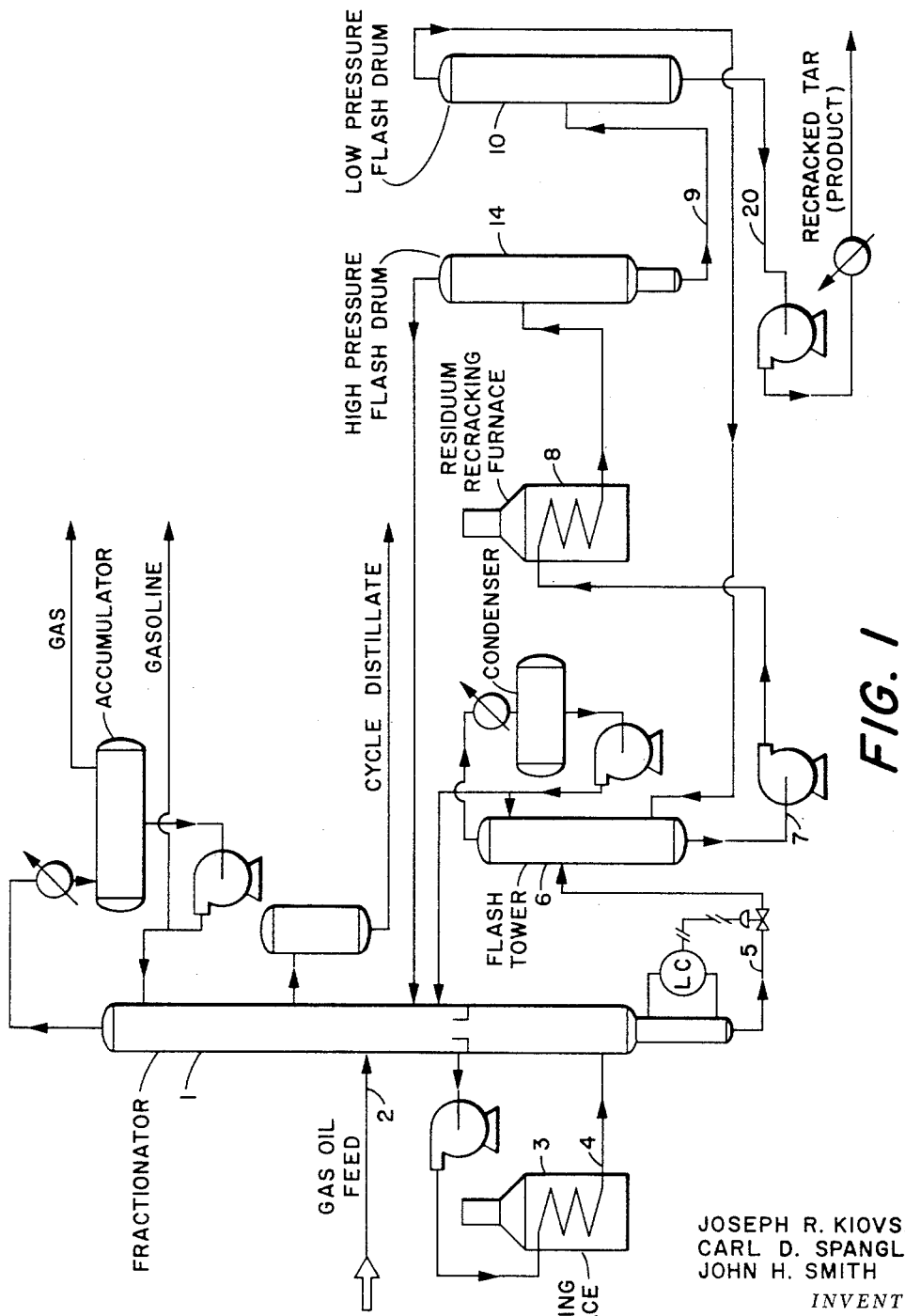

This invention is a process for the production of an aromatic petroleum oil suitable as a feedstock for the manufacture of carbon black. More specifically, the process involves the thermal cracking of a virgin petroleum gas oil followed by the thermal recracking of the tar derived from the initial thermal cracking operation and recovery of a recracked tar suitable for use as a carbon black feedstock ("carbon black oil").

Carbon black is especially useful as a filler to improve the wearing qualities of natural and synthetic rubber. The carbon black industry has shifted from the older natural gas processes to the use of modern furnaces which are designed to operate on variosu oil feedstocks. The demand for high quality carbon black oils is tending to outdistance the supply. This is aggravated by development of competing uses for the highly aromatic heavy oils, for example, for the production of premium grade coke.

The higher the carbon-to-hydrogen ratio of the oil, the higher will be the yield of black and also the higher the capacity of a given plant. The preferred feedstocks are rich in polycyclic aromatics because, in contrast to paraffins, heavy aromatics yield very little hydrocarbon gas upon pyrolysis; a high percentage of the contained carbon is yielded as black.

The carbon black oils are often produced by the thermal cracking of cycle oils, the tar from such thermal cracking operation being the carbon black oil. The cycle oils referred to are derived from thermal or catalytic cracking units. U.S. Patent No. 2,764,527 discloses the production of a carbon black feedstock by the thermal cracking of a cycle oil derived from a catalytic cracker. U.S. Patent No. 2,895,895 disclosses the manufacture of carbon black oil by thermally cracking a mixture of a lube oil extract and a catalytic cycle oil.

A highly aromatic thermal tar can be produced by conventional thermal cracking of essentially any hydrocarbon fraction provided that all of such fraction is lower boiling than the front end of the product tar. On the other hand, if the boiling ranges of the feedstock and product tar are highly overlapping, the tar from conventional thermal cracking will be highly aromatic only if the feedstock itself is quite aromatic because the tar will be more or less diluted with uncracked feedstock components.

The specifications for carbon black oils are quite important, particularly for carbon black used for rubber compounding. For example, if the asphaltene content of the carbon black oil is too high, the carbon black may contain grit, which is undesirable. Specifications for a high-quality carbon black oil are as follows:

| | | |
|---|---|---|
| Gravity, ° A.P.I. | max | 2.0 |
| Specific gravity | min | 1.0599 |
| Viscosity, SSU, at 210° F. | max | 80 |
| Viscosity, SSF at 122° F. | | 70/120 |
| Asphaltenes, percent by weight | max | 9.0 |
| Correlation Index (C.I.) | min | 120 |
| Sulfur, percent by weight | max | 1.75 |

The correlation index referred to above was developed by the United States Bureau of Mines and denotes the aromaticity of an oil. The index is calculated from the formula:

$$C.I.= \frac{48640}{K} +473.7G-456.8$$

where:
C.I.=Bureau of Mines correlation index
K=average boiling point (°K) of the fraction
G=specific gravity at 60° F./60° F.

Brief summary of the invention

This invention is a process of thermally recracking a thermal tar to increase its aromaticity whereby it is possible to produce a high-quality carbon black oil by the thermal cracking of virgin gas oils. A tar from a conventional thermal cracking unit (operating on a virgin gas oil feedstock) is charged through a separate furnace coil wherein it is recracked to increase its aromaticity. Cracked vapors are then separated from the recracking furnace effluent to yield a residue of higher aromaticity suitable for use as a carbon black oil.

To minimize the formation of heavy asphaltenes upon recracking, it is desirable to recrack at relatively high temperature and short residence time. To avoid rapid coking of the recracking furnace tubes, it is desirable to suppress vaporization therein and to maintain a high liquid flowing velocity therethrough. It is also desirable to maintain a reasonably uniform heat density around the circumference of the furnace tubes, particularly the latter section of tubes known as "soaking tubes," thus helping to avoid coking due to excessive localized heat densities. This can best be achieved by firing the soaking tubes from both sides. The heating tubes may also be advantageously fired from both sides.

Drawings

FIGURE 1 is a simplified process flow diagram illustrating the process in its most basic form.
FIGURE 2 is a somewhat more detailed process flow diagram of the preferred mode of operation.

Detailed description

Referring to FIGURE 1, a virgin gas oil feed is introduced through line 2 into the cracker fractionator 1. The gas oil feed from the fractionator is passed to cracking furnace 3 which is operated under conventional thermal cracking conditions: 300 to 800 p.s.i.g. back pressure and 850 to 1000° F. at the furnace outlet.

The product of the cracking furnace is introduced into the bottom of the fractionator through line 4. The gas and distillate products are removed from the top of the fractionator and the bottoms from the tower are introduced into residuum flash tower 6. Vapors from the flash tower are returned to the fractionator and the bottoms (thermal tar) are introduced to the residuum recracking furnace 8 through line 7.

The cracked porducts from residuum recracking furnace 8 are fed to high pressure flash drum 14, the bottoms from which are fed through line 9 to low pressure flash drum 10. Vapors from the high pressure flash drum are returned to the fractionator and the vapors from the low-pressure flash drum are returned to flash tower 6. The recracked tar from the bottom of the low pressure flash drum is the product carbon black oil.

Referring to FIGURE 2, light gas oil and heavy gas oil from a vacuum unit (not shown) are fed through lines 2a and 2b, respectively, to cracker fractionator 1. A light gas oil and heavy gas oil are taken from the fractionator and fed through lines 2c and 2d to light oil furnace and heavy oil furnace 3a and 3b, respectively, the products of which flow to the flash zone of the fractionator 1 through lines 4a and 4b. The two streams (light oil and heavy oil) are cracked in separate furnaces to provide greater selectivity of cracking conditions. The light oil furnace or furnaces have an outlet condition of about 1,000° F. and 750 p.s.i.g. The heavy oil furnace has an outlet condition of about 925° F. and 500 p.s.i.g. The fractionator is designed to operate at about 200 p.s.i.g. at the top of the tower. The gas and distillate products are removed from the upper portion of the fractionator. The residuum from the fractionator is passed through line 5 to atmospheric flash tower 6. Steam is introduced to the atmospheric flash tower through line 9. The overhead from the flash tower passes to condenser 11 from which any gases are vented, water is removed through line 12, and condensed hydrocarbons are returned in part to the flash tower 6 and in part to fractionator 1. Bottoms (thermal tar) from the flash tower are passed to residuum recracking furnace 8 through line 7. Steam is injected into line 7 through line 13 to maintain the correct tube velocity and residence time in the recracking furnace. The residuum recracking furnace 8 is designed to operate under the following conditions:

| | |
|---|---|
| Average heat density in heating section _____B.t.u./hr./ft.² __ | 8,000–12,000. |
| Average heat density in soaking section _____B.t.u./hr./ft.² __ | 4,000–8,000. |
| Temperature (outlet from heating section) _____° F__ | 850–925. |
| Temperature (outlet of soaking section) _____ | 900–950. |
| Pressure outlet from soaking section _____ | 150–1000 p.s.i.g., preferably 150–300 p.s.i.g. and most preferably 200 p.s.i.g. |
| Velocity throughout coil (figured as feed liquid at 60° F.) _____ | 4–12 feet per second, most preferably 6–8 feet per second. |

The effluent from the recracking furnace passes to evaporator 14 where gas and gasoline flash from the residuum and flow back to the flash zone of fractionator 1 through line 15. The bottoms from the evaporator flow to the residuum flash tower 10 where gas oils are condensed and returned through line 17 to fractionator 1. Steam is introduced to the stripping section of flash tower 10 through line 18. The cracked residuum (tar) is steam stripped in the residuum flash tower 10 and withdrawn from the tower through line 20 and passed to the product storage. This cracked residuum or tar, identified in FIGURE 2 as recracked tar, is the desired carbon black oil product. Steam from the top of tower 10 is removed and may be returned through line 21 for use as stripping steam in flash tower 6. Alternate line 21a leads to a vacuum system if it is desired to operate tower 10 under vacuum.

*Example*

Light vacuum gas oil (line 2a):
  Gravity—28.7° API; mol. wt. 310.
  Charge: 11,000 b.p.s.d. @ 60° F.; 141,172 pounds/hr.
  Temperature: 450° F.
Heavy vacuum gas oil (line 2b):
  Gravity—20.5° API; mol. wt. 472.
  Charge: 14,225 b.p.s.d. @ 60° F.; 193,040 pounds/hr.
  Temperature: 700° F.
Conditions in fractionator 1:
  Top of tower: 400° F., 200 p.s.i.g.
  Bottom of tower: 820° F.
Light oil feed to furnace 3a:
  35,000 b.p.s.d.; 476,369 pounds/hr.
Heavy oil feed to furnace 3b:
  30,000 b.p.s.d.; 420,824 pounds/hr.
Furnace 3a:
  Inlet temperature, 750° F.; outlet temperature 1000° F.
  Outlet pressure, 750 p.s.i.g.
Furnace 3b:
  Inlet temperature, 740° F.; outlet temperature, 925° F.
  Outlet pressure, 500 p.s.i.g.
Residuum to flash tower 6 (line 5):
  Gravity—10.5° API
  820° F.
  Flow rate 295,265 pounds/hr.; 20,260 b.p.s.d.
Flash tower 6:
  Pressure 5 p.s.i.g.; temperature 700° F.
  Steam (line 9): 50 p.s.i.g., saturated; 1,000 pounds/hr.
Feed to recracking furnace (line 7):
  Flow rate 8,810 b.p.s.d.; 132,000 pounds/hr.
  Temperature 700° F.
Steam (line 13): 600 p.s.i.g.; 750° F.; 500 pounds/hr. max.
Recracking furnace:
  Duty 37,142,000 B.t.u./hr.
  Outlet conditions: 940° F.; 230 p.s.i.g. (300 p.s.i.g. max.)
Evaporator 14:
  Pressure 210 p.s.i.g.; temperature 840° F. top, 820° F. bottom
Residuum flash tower 10:
  Feed rate 170,958 pounds/hr.
  Steam (line 18): 3,000 pounds/hr.; 50 p.s.i.g. saturated
  Full vacuum or up to 5 p.s.i.g.
  Temperature (line 21): 250° F.

The recracked tar product (line 20) at the rate of 6,760 b.p.s.d. (105,204 pounds/hr.) is cooled and passed to storage. This product meets the above-mentioned specifications for high-quality carbon black oil.

While specific details of the preferred mode of operation have been given in the foregoing for purposes of illustration, it is to be understood that the invention is not limited thereby, but is to be taken as limited solely by the language of the appended claims.

We claim:
1. A process for manufacturing carbon black oil comprising the steps of thermally cracking a virgin gas oil, separating tar from the cracked products, thermally recracking the tar, and separating from the recracked effluent a recracked tar suitable for use as a carbon black oil, said recracking step being carried out under the following conditions in order to minimize the production of coke:
  (a) Average heat density in soaking section of the recracking furnace; about 4,000–8,000 B.t.u./hour/square foot;
  (b) Temperature at outlet of said soaking section: about 900°–950° F.;
  (c) Velocity throughout the furnace coil (figured as feed liquid at 60° F.): about 4–12 feet per second.
2. The process of claim 1 in which the recracking step is carried out at about 150–300 p.s.i.g.

3. The process of claim 2 in which the furnace oil velocity is about 6–8 feet per second.

4. The process of claim 1 in which at least the soaking tubes of the furnace are fired from both sides.

5. The process of claim 2 in which at least the soaking tubes of the furnace are fired from both sides.

6. The process of claim 3 in which at least the soaking tubes of the furnace are fired from both sides.

References Cited

UNITED STATES PATENTS

| | | | |
|---|---|---|---|
| 2,762,754 | 9/1956 | Offutt et al. | 208—106 |
| 2,895,895 | 7/1959 | DeRidder et al. | 208—106 |
| 3,240,565 | 3/1966 | Krejci et al. | 208—50 |

DELBERT E. GANTZ, *Primary Examiner.*

A. RIMENS, *Assistant Examiner.*